Patented Nov. 22, 1932

1,888,295

UNITED STATES PATENT OFFICE

PRESTON R. SMITH, OF RAHWAY, NEW JERSEY, ASSIGNOR TO THE BARBER ASPHALT COMPANY, OF PHILADELPHIA, PENNSYLVANIA, A CORPORATION OF WEST VIRGINIA

BITUMINOUS EMULSION AND METHOD OF PRODUCING

No Drawing.    Application filed July 26, 1928.    Serial No. 295,614.

My invention relates to an improvement in bituminous emulsions and method of producing and more particularly relates to bituminous emulsions which are substantially resistant to breaking or separation on freezing and thawing.

Heretofore it has been known to produce bituminous emulsions for use as binders, adhesives, coating compositions, etc., and such emulsions have heretofore included pitches, tars and tar-like substances, resins, natural and artificial asphalts and asphaltic products, and the like, emulsified, for example, by agitation with an aqueous dispersing medium as, for example, an alkali, a soap or saponaceous material, etc. Such emulsions are used as binders, adhesives, coating compositions, etc. and for impregnating and surfacing purposes.

Emulsions of the character indicated as heretofore produced have proved satisfactory under normal conditions, but such emulsions, irrespective of the particular emulsifying material, or dispersing medium used, have possessed a serious defect in that on freezing and thawing they break or separate and this defect has largely prevented the shipment and use of bituminous emulsions during the winter months.

Among the various dispersing mediums, or emulsifying agents, heretofore used in connection with the production of bituminous emulsions, sulphonated oils have been used, but the resultant emulsion has had only a limited use since on subjection to freezing temperature, whether in storage or in transit, followed by thawing, it will break and be destroyed.

Now in accordance with my invention, I have discovered that if a solution of sulfonated animal, vegetable or fish oil, with or without the inclusion of other emulsifying agents, having an alkalinity within about the limits pH 11.5–pH 13.2, be used as the emulsifying agent, or dispersing medium, the resultant emulsion will be of the desirable oil-in-water type and will be stable at all natural temperatures to which the emulsion may be subjected and will not break on freezing and thawing.

As illustrative of the practical adaptation of my invention, for example, 5 pounds of 75% Turkey red oil and 2.5 pounds of sodium hydroxide are dissolved in sufficient water to make a total of 250 pounds and will give a solution having an alkalinity of about pH 12.80. 70 pounds of asphalt, more or less, are then emulsified, for example, by agitation with 30 pounds, more or less of the solution as a dispersing medium and the resultant emulsion will be found to remain stable with repeated freezing and thawing.

As a further example, 2 pounds of 75% Turkey red oil, 0.89 pounds of rosin and 0.265 pounds of sodium hydroxide are dissolved in 100 pounds of water and will give a solution having an alkalinity of about pH 11.68 and with which may be produced emulsions which will be stable under repeated freezing and thawing.

Further, for example, 1 pound of 75% Turkey red oil, 1 pound of ordinary yellow laundry soap and 0.5 pound of sodium hydroxide dissolved in 97.5 pounds of water will give a solution having an alkalinity of about pH 12.65 and may be used as an emulsifier for the production of emulsions stable under conditions of freezing and thawing.

In the use of the above indicated solutions in the preparation of emulsions, for example, 70 parts, more or less, of bitumen, as asphalt, may be readily emulsified with 30 parts, more or less, of the solution by any of the well known methods and with the usual known equipment for effecting emulsification.

As an alternative procedure for the production of emulsions in accordance with my invention, a bituminous emulsion may be made with an emulsifier of an alkalinity somewhat below pH 11.5 and then frozen and thawed. On thawing the emulsion will be found to have only partly broken, or separated, and the unbroken part will on removal from the separated bitumen be found to have a higher pH value than did the original emulsion and to be stable when frozen and thawed.

Such procedure is equivalent to producing emulsions of relatively low bitumen content by using an emulsifier of somewhat less alkalinity than specified as preferable in connection with the above examples.

In connection with the above description of my invention, I have referred particularly to the alkalinity, or pH value, of the emulsifier as controlling the resistance to breaking of the emulsion on freezing and thawing. As a practical matter, the pH value of the emulsifier may be said to be the controlling factor, but it will be understood that it is not improbable that the alkalinity, or pH value, of the completed emulsion is the controlling factor. While it is extremely difficult, if not impossible, to obtain accurately the pH value of the finished emulsion, I have obtained some data indicative of the pH value of the completed emulsion which indicates that the pH value of the completed emulsion will be somewhat lower than the pH value of the emulsifier when the bitumen emulsified is within the usual range of quantity for such emulsions, say within the range about 60%–70%. For example, I have found that an emulsion containing about 60%–70% bituminous material produced with an emulsifier having an alkalinity equivalent to about pH 11.5–pH 13.2 may be expected to have an alkalinity equivalent to about pH 9.0–pH 12.0. I have also found that the more bitumen dispersed in the emulsifier and the smaller the particle size of the dispersed phase the lower will be the pH value of the completed emulsion.

It will be understood that my invention is not limited to the use of any particular alkali, or source of suitable alkalinity, since I may use any caustic alkali, or alkaline salt, or mixture of such alkaline materials, or any other substances capable of producing alkalinity, as will bring the alkalinity within the desired range of pH value; and it will be understood that my invention contemplates the use as emulsifiers of sulfonated animal, vegetable or fish oil, as, for example, Turkey red oil, sulfonated olive oil, sulfonated cocoanut oil, sulfonated cod oil, etc. etc., and as equivalents the sulfonated fatty acids or soaps derived therefrom by saponification. It will also be understood that other known emulsifying agents, as soaps, etc. etc., may be included with the sulfonated oil.

What I claim and desire to protect by Letters Patent is:

1. A bituminous emulsion including bitumen dispersed in an aqueous dispersing medium including an alkaline salt of a sulfonated oil and having an alkalinity within about the range pH 11.5–pH 13.2.

2. A bituminous emulsion including bitumen dispersed in an aqueous dispersing medium including an alkaline salt of a sulfonated oil and another emulsifying agent and having an alkalinity within about the range pH 11.5–pH 13.2.

3. A bituminous emulsion including bitumen dispersed in an aqueous dispersing medium including an alkaline salt of Turkey red oil and having an alkalinity within about the range pH 11.5–pH 13.2.

4. A bituminous emulsion including asphalt dispersed in an aqueous dispersing medium including an alkaline salt of a sulfonated oil and having an alkalinity within about the range pH 11.5–pH 13.2.

5. A bituminous emulsion including asphalt dispersed in an aqueous dispersing medium including a alkaline salt of a sulfonated oil and another emulsifying agent and having an alkalinity within about the range pH 11.5–pH 13.2.

6. A bituminous emulsion including bitumen dispersed in an aqueous dispersing medium including an alkaline salt of a sulfonated oil and having an alkalinity within about the range pH 11.68–pH 12.80.

7. A bituminous emulsion including bitumen dispersed in an aqueous dispersing medium including an alkaline salt of Turkey red oil and having an alkalinity within about the range pH 11.68–pH 12.80.

8. A bituminous emulsion including asphalt dispersed in an aqueous dispersing medium including an alkaline salt of a sulfonated oil and having an alkalinity within about the range pH 11.68–pH 12.80.

9. A bituminous emulsion including bitumen dispersed in an aqueous dispersing medium including an alkaline salt of a sulfonated oil and a soap and having an alkalinity within about the range pH 11.5–pH 13.2.

10. A bituminous emulsion including asphalt dispersed in an aqueous dispersing medium including an alkaline salt of a sulfonated oil and a soap and having an alkalinity within about the range pH 11.5–pH 13.2.

11. A bituminous emulsion including bitumen dispersed in an aqueous dispersing medium including an alkaline salt of Turkey red oil and another emulsifying agent and having an alkalinity within about the range pH 11.5–pH 13.2.

12. A bituminous emulsion including bitumen dispersed in an aqueous dispersing medium including an alkaline salt of Turkey red oil and a soap and having an alkalinity within about the range pH 11.5–pH 13.2.

In testimony of which invention, I have hereunto set my hand, at Maurer, N. J., on this 23 day of July, 1928.

PRESTON R. SMITH.